(12) United States Patent
Goldspink

(10) Patent No.: US 11,149,504 B2
(45) Date of Patent: Oct. 19, 2021

(54) DRILL FLUID RECOVERY APPARATUS

(71) Applicant: R.J. Goldspink PTY LTD, Kandos (AU)

(72) Inventor: Robert Goldspink, Kandos (AU)

(73) Assignee: R.J. GOLDSPINK PTY LTD, New South Wales (AU)

( * ) Notice: Subject to any disclaimer, the term of this patent is extended or adjusted under 35 U.S.C. 154(b) by 438 days.

(21) Appl. No.: 15/123,696

(22) PCT Filed: Mar. 9, 2015

(86) PCT No.: PCT/AU2015/050093
§ 371 (c)(1),
(2) Date: Sep. 6, 2016

(87) PCT Pub. No.: WO2015/131251
PCT Pub. Date: Sep. 11, 2015

(65) Prior Publication Data
US 2017/0074061 A1    Mar. 16, 2017

(30) Foreign Application Priority Data
Mar. 7, 2014   (AU) ................................ 2014900779

(51) Int. Cl.
*E21B 21/06* (2006.01)
*E21B 21/01* (2006.01)
*B01D 29/23* (2006.01)
*B01D 35/28* (2006.01)
*E21B 7/02* (2006.01)

(52) U.S. Cl.
CPC ............ *E21B 21/065* (2013.01); *B01D 29/23* (2013.01); *B01D 35/28* (2013.01); *E21B 7/025* (2013.01); *E21B 21/01* (2013.01)

(58) Field of Classification Search
CPC ............................... E21B 21/01; E21B 21/065
See application file for complete search history.

(56) References Cited

U.S. PATENT DOCUMENTS

| | | | |
|---|---|---|---|
| 2,634,952 | A | 4/1953 | Brinkley |
| 4,921,375 | A | 5/1990 | Famulari |
| 6,216,799 | B1 | 4/2001 | Gonzalez |
| 6,712,162 | B2 | 3/2004 | Britz |
| 7,726,417 | B2 | 6/2010 | Larsson |
| 2002/0027023 | A1 | 3/2002 | Britz |
| 2008/0283302 | A1 | 11/2008 | Larsson |

FOREIGN PATENT DOCUMENTS

| | | |
|---|---|---|
| CA | 2071089 A1 | 12/1993 |
| GB | 792632 A | 4/1958 |

*Primary Examiner* — Kristyn A Hall
(74) *Attorney, Agent, or Firm* — William J. Clemens; Shumaker, Loop & Kendrick, LLP

(57) ABSTRACT

An apparatus (10) for handling drill water comprises a funnel (12) and a spillway (16) which act in concert to receive and then separate a slurry mixture into constituent drill cuttings and spent rinse water. The funnel (12) collects the falling slurry mixture, which is channelled via conduit (56) into a spillway (16). The spillway (16) is fitted with a dewatering grate (80) onto which the slurry mixture from the funnel (12) is channelled. The flow of slurry mixture is moderated by a baffle (78) which both catches and discharges slurry mixture delivered by the conduit (56). The slurry mixture is discharged over the dewatering grate (80), which drains the spend rinse water into a section of the spillway (16), and discharges the drill cuttings away from the grate (80).

18 Claims, 11 Drawing Sheets

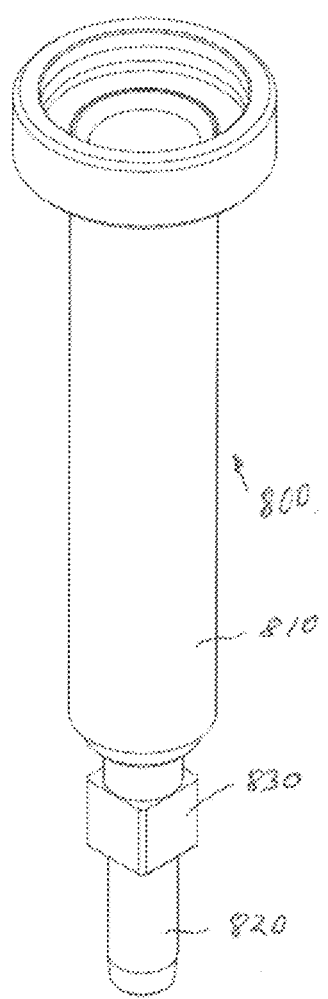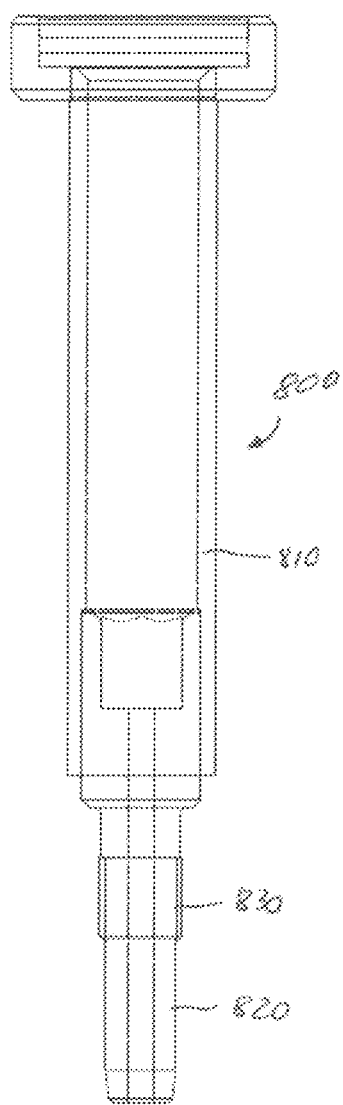
FIG 8A
FIG 8B

DRILL FLUID RECOVERY APPARATUS

FIELD OF THE INVENTION

The present invention relates to water management during drilling, especially as relates to overhead drilling operations such as is typical in underground mines and tunnel construction. In particular, the present invention is concerned with apparatus for recovery and/or catchment of liquids used for cooling rock cutting tools such as rotary drill steels or bits and/or flushing drill cuttings from a bore hole.

BACKGROUND TO THE INVENTION

Overhead and rock face drilling is frequently performed in mining, in particular underground mining such as coal mining, and in the course of excavation, tunnelling and so forth.

Short and long bore drilling into a rock face or other material produces drill cuttings and other debris that require removal from the bore during drilling. Fines and dust particles are also created in the process, which need to be entrapped and prevented from freely escaping the bore and thus creating potentially hazardous dust clouds in a mine shaft or tunnel, in particular when coal seam mining.

Early attempts to address dust cloud creation in coal mining using purely air-cooled drilling steels and bits include the use of dedicated dust collector devices, generally comprising some form of dust confinement hoods or similar structures which are positionable at the rock face about the location of the bore to be drilled. An opening in the hood which allows passage of the drill string towards the capped-off bore location at the cutting face may or may not comprise some type of curtain or sluice structure to minimise egress of dust past the drill string from within the hood. A duct leading from within the hood provides a discharge to remove dust and cuttings created during drilling. These are extracted using forced air flow or suction devices, into a suitable receptacle/collection container. U.S. Pat. No. 2,634,952 (Brinkley) describes one such apparatus.

Equally applicable/transferable to mining/tunnelling operations involving drilling, U.S. Pat. No. 4,921,375 (Femulari) describes an anti-scattering device for the collection of waste material produced in the course of drilling, milling, grinding and similar machining operations, comprising a cylindrical or frusto conical bellows screen whose one open end can be secured to the front of the housing of the tool about the location where the chuck and drilling/milling/grinding bit protrude from the housing, and whose opposite open end (carrying an annular sealing ring), can be pressed against the surface to be machined, to seal off the space surrounding the cutting tool. A fan or vacuum device is in communication with the inside of the bellows structure to remove cuttings into a container that is coupled via a discharge tube to the inside of the bellows structure.

More commonly used nowadays are rock (and other strata) drilling apparatus and rigs which utilise liquids to (a) cool the drilling bit or cutting elements of the tool, (b) supress dust generation and (c) flush away the drill cuttings from short and long bore drilling holes. Many drill masts and rigs often employ hollow drill strings, which attach to a drill bit, or other rock/strata cutting tool, through which cooling/flushing/lubricating liquid is delivered to the cutting face. In some devices, the pressurised liquid passes through the drill motor, but in any event the flushing/cooling liquid is injected into and pumped through the hollow drill string, through the drill chuck and into or past the cutting device proper (steel of bit) to cool and/or lubricate the cutting elements at the drill face location.

The cooling/lubricating liquid, which may be simply water with or without additives, or a type of drilling mud, washes away the drill cuttings and fines out of the drill hole. Air-borne dust is thus avoided, though there is considerable 'spent' cooling/flushing liquid generated as a result, which represents a significant logistical compromise and environmental load, if disposed without treatment or otherwise re-cycled.

As an example, in some instances, it is not uncommon to use 1500 L/hour in drilling processes, which if not methodically collected and evacuated can quickly cause the surrounding ground to become unstable and hazardous. Such hazards are compounded by the difficulty of underground conditions.

Different cooling/flushing liquid management solutions have been suggested and/or used in the prior art.

One ad hoc solution, which is still widely used today, is to place a pan or basin of some sort directly below the drilling site, and use special pumps that are resistant to abrasion by the cuttings/fines entrapped in the flushing liquid, to convey the 'spent' liquid and the cuttings (also referred to as "drilling slurry") into a separate facility for separating the liquid from the solids to a required degree of filtration.

As the drilling slurry contains drill cuttings of various sizes, it can be particularly difficult to pump this material, even using special slurry pumps. Conventional, general purpose water pumps can not be used, as these would malfunction under such operating conditions.

Another solution is to use dedicated drill liquid/drilling slurry collection structures in close proximity to the drilling hole location or otherwise carried at the drill rig, such as to receive most of the discharged drilling slurry. Some of these devices have an operating principle very similar to that of the Brinkley patent device.

For example, U.S. Pat. No. 7,726,417 (Larsson), assigned to Husqvarna A B of Sweden, describes a drill cooling water collecting device (collector) arranged above a drilling machine so as to capture drilling slurry and thus prevent it from running down and into the drill rig's motor, thus preventing damage being caused to the machine. The water collector comprises a squat, open-top cylindrical vessel having a flat bottom and a relatively short cylindrical side wall. The flat bottom has a draining hole connecting to an associated draining duct through which drilling slurry collected in the collector can be pumped for subsequent treatment/reclamation.

The water collector pan is used in conjunction with an anti-scatter screen, in form of a cylindrical bellows of smaller diameter than the collector pan, which surrounds the drill string that passes through a hole in the flat bottom in which a bearing and sealing structure for the drill string is received, and which extends all the way from the drill hole location (and thus drill bit/steel tip) to the water collector pan. The anti-scatter screen thus confines drilling slurry to drop towards the collector pan, catching most if not all the water for subsequent recycling. Other features are mentioned, but the water collecting arrangement described and depicted by Larsson suffers some limitations which compromise its practicality.

As is the case with the ad-hoc solution described above, special (and costly) suction pumps which are abrasion-resistant to drilling slurry, are required for draining away the liquid and drill cuttings that are gathered in the collector pan, towards a non-illustrated, separate liquid-cuttings separator tank or device.

U.S. Pat. No. 6,712,162 (Britz) describes a collector structure that is very much similar to that of Larsson (but for use in horizontal drilling applications) wherein, a squat cylindrical slurry collection pan is provided, which has a through hole in its flat base to allow passage, in sealing but movement-permitting manner, of a hollow-core, cylindrical drill bit. The rim of the cylindrical wall of the pan, which carries an annular sealing lip, can be pressed onto the cutting face and thus enclose the area surrounding the location where the drill bit is to cut a bore. The slurry draining port is located in the cylindrical wall and connects to a slurry discharge line.

The device of Britz thus obviates the need for a bellows screen to prevent scattering, as per Larsson. More relevantly, Britz illustrates a cooling/flushing liquid re-cycling circuit and system by way of which cooling/flushing liquid is recovered from the slurry. Two closed liquid holding tanks, a first on of which receives the slurry (and thus is a holding tank) and the second one of which houses a filtration device (and thus is a filtration unit) form part of the recycling circuit. A pressure pump is used to convey slurry from the first into the second tank. It will be noted that such arrangement, with its separate components still requires a special pump capable of pumping slurries with a potentially high drill cuttings and fines load. Given that the second filtration tank is a closed one, removal of the residual particulate material (ie the fines and cuttings) requires intermittent operation to effect cleaning and prevent clogging of the recirculation circuit.

An object of the present invention is to provide an apparatus for recovery of cutting tool cooling liquid/drill cuttings flushing liquid that at least ameliorates one or more limitations of existing approaches to managing spent rinse water arising from drilling operations.

Another object is to provide an apparatus that simplifies separation of drilling slurry into fractions comprising a liquid fraction that can be re-cycled substantially for re-use without filtration at a separate unit, and a slurry fraction comprising the bulk of solid particulates from the bore hole drilling operation.

Another object is to provide an apparatus of aforementioned type that can be easily retrofitted onto existing overhead rock drilling rigs and apparatus.

SUMMARY OF THE INVENTION

The present invention arises from the insight that drilling slurry from drilling operations can not only be advantageously collected close to the drill hole location, but can be effectively filtered in a purpose-designed collection device to a desired degree to obtain an effluent liquid stream that can be recycled into the cooling/flushing liquid supply for the drilling machine/rig. The drill cuttings and fines separated at the device, which represent a substantially 'dewatered', primarily particulate refuse stream, can be discharged to the ground surrounding the drilling rig, or into a separate container that can then be easily transported away from the drilling site to land fill or further processing.

The present invention in one aspect advantageously provides a drilling fluid recovery apparatus, comprising: a mounting structure shaped to allow removable mounting of the apparatus to a housing part of an overhead drilling apparatus; a funnel structure having a base with an aperture for passage of a drill steel or drill chuck of the drilling apparatus and having a slurry discharge port proximate the base, the funnel structure adapted for receiving a slurry mixture of drill cuttings and spent drill liquid produced during a drilling operation; and a spillway structure having at a lower end thereof a liquid catchment zone with a liquid discharge port and at an upper end thereof a liquid draining zone with a filtering grate operatively fitted thereto at an inclined angle vs the vertical, the spillway structure arranged such that slurry mixture exiting the slurry discharge port from the funnel structure gravity feeds onto an upper end and upper side of the filtering grate to move along the filtering grate towards a lower end for discharging from the spillway structure while liquid is drained from the slurry mixture towards the liquid catchment zone located underneath the filtering grate.

One advantage which the presently devised drilling fluid recovery apparatus provides is that there is no need for a bellows-like skirt to surround the drilling zone between the drill liquid catchment pan and rock face, as per the Larsson patent document. The drill chuck remains open to visual inspection to operators, and can be readily changed as required. Furthermore, adding, swapping or removing drill steels is relatively straightforward, as the apparatus does not prevent access to the drill chuck.

The filtering grate of the spillway structure will advantageously comprise a plurality of rods arranged in a grid, preferably an orthogonal grid of square or rectangular cross-section steel rods, wherein the spacing between lengthwise and width-wise running rods can be chosen to be the same or different. The spacing between the width-wise extending rods may also be varied along the extension of the grate from its upper, slurry receiving zone towards the lower, slurry discharging zone, to cater for hydraulic changes in the slurry as liquid is drained away as the 'dewatering' slurry spills/moves under gravity influence along the grate.

Advantageously, the funnel structure will be dimensioned to have an internal volume that is sufficient to temporarily receive and store drill cuttings and spent drilling liquid expected during a drilling operation, without overspilling, while simultaneously discharging the slurry towards the spillway for liquid removal.

To this end, the funnel structure may advantageously comprise a removable collar extension with a vertical peripheral wall, mountable to the open top end of a lower funnel section having at least in part inclined inner faces terminating at the base of the funnel structure. The collar can advantageously be formed of a resilient material which is transparent or at least translucent to permit ready visual inspection. Further, the slurry discharge port of the funnel structure will preferably communicates with a conduit pipe for draining the funnel structure into the spillway in controlled manner, the pipe's dimensions being chosen such that an expected, predetermined amount of drill cuttings and spent drilling liquid can be discharged at a defined flow rate without blockage.

A wide mesh or grate guard of suitable size can advantageously be fitted inside or above the open top end of the funnel structure, to avoid ingress of rocks above a certain size amongst the drill cuttings, which might otherwise block the funnel.

In a particularly preferred form, the spillway can have, at least in part, a duct-like channel configuration, with opposite vertical side walls and a rear wall spanning the side walls forming a vertical, u-shaped, front-side open channel. The filtering grate having a flat, planar configuration is then located to extend between the side walls in inclined fashion from near an upper end close to the rear wall towards a lower end distant from the rear wall and flush with a vertical front wall spanning the side walls and which closes the u-channel to define an enclosed zone below the liquid catchment zone located underneath the filtering grate; in other words, the filtering grate provides a front side closing the u-channel, but in inclined manner, separating the front where the slurry cascades downwards as consequence of the incline of the grate, and the liquid catchment part at the rear of the duct.

Advantageously, an upper end of the spillway structure may comprise a removable access door, fitted opposite the location where the slurry discharge port/conduit pipe drains into the spillway/is located. This allows an operator to have access to unblock the pipe/port if required. The inside of the door acts as a 'splatter' element to diffuse and distribute the incoming slurry prior to it being deposited onto the filter grate.

A baffle is advantageously positioned in an upper end of the spillway, opposite the outlet of the slurry discharge conduit pipe to moderate flow of the slurry mixture onto the filtering grate in the spillway. The baffle is preferably formed of a resilient material, and advantageously provided in the form of a concave strip running over the entire width of the spillway. Advantageously, the baffle can then be mounted in removable manner at the access door. The baffle in this form assists in spreading the slurry being discharged from the pipe and scattered against the removable door (access plate) into a more uniform band of slurry from where it cascades onto the filtering grate (which may also be called a screen) fitted to the spillway. This also allows one to use filtering grates of smaller dimensions in the cascading direction (flow or length direction) as a more spread-out flow is achieved over the width of the grate right at the top of it.

The liquid catchment zone of the spillway is advantageously provided with or connected to a rain water head structure, with or without an additional filtering mesh, which in turn drains to a downpipe for directing the liquid removed from the slurry to further use or discharge.

The filtering screen (grate), which is preferably a planar grate structure comprising of traversing and intersecting square cross-section rods, is advantageously angled in the spillway at between 45° and 65° to a horizontal plane, and more preferably at approximately 55° to a horizontal plane, so that the slurry mixture cascades down the filtering grate in a controlled manner as it is 'dewatered' prior to discharge of the 'dewatered' drill cuttings.

It will be understood that the grate is designed to remove a substantial part of the liquid, without fully filtering the reclaimed liquid of drilling fines. The reclaimed liquid may carry fines in suspension of an average particle size which does not substantially impede pumping of the liquid using conventional eg ring pumps as used in overhead drill rigs to supply flushing water ((liquid) via the drill bit into the bore for flushing the cuttings out of the bore.

The present invention thus in another but related aspect provides a system for recovering bore hole flushing or rinse fluid from drilling slurry comprised of drill cuttings and liquid obtained in a strata drilling operation, comprising an apparatus as described above, mounted atop an overhead drilling rig, a drainage pipe connected to the apparatus for receiving fluid drained by the apparatus from the slurry mixture, a holding tank connected to the drainage pipe for temporary storage of drained liquid, plumbing connecting the storage tank to the drill rig flushing liquid supply line(s), and a pump for pumping drained liquid from the holding tank via the plumbing to the drill rig for re-use in bore hole drilling.

In yet a further aspect, the invention also provides an overhead drill rig with recycled borehole flushing water delivery arrangement, comprising an overhead drilling rig with a drill motor and drilling tools, an apparatus as above described, a drainage pipe connected to the apparatus for receiving liquid drained from the slurry mixture via the liquid catchment zone located underneath the filtering grate of the apparatus, a holding tank connected to the drainage pipe, and a water pump for delivering reclaimed liquid stored in the holding tank to the drill motor for re-use during a drilling operation.

Further aspects of the present invention, and preferred and/or optional features thereof will become apparent also to the skilled reader from the following description of a preferred embodiment which is provided with reference to the accompanying drawings.

BRIEF DESCRIPTION OF THE DRAWINGS

FIG. 6A depicts a cross-sectional view through a centre line of the apparatus, while FIG. 6A depicts a cross-sectional view at a minimal offset from a near side of the apparatus.

FIGS. 8A and 8B are associated perspective and front elevation views of a chamfered drill chuck for use with the apparatus of FIGS. 1 and 2, as depicted in FIGS. 7A and 7B, with hidden lines depicted in dash in the front elevation of FIG. 8B.

DESCRIPTION OF PREFERRED EMBODIMENTS

Figure 1:
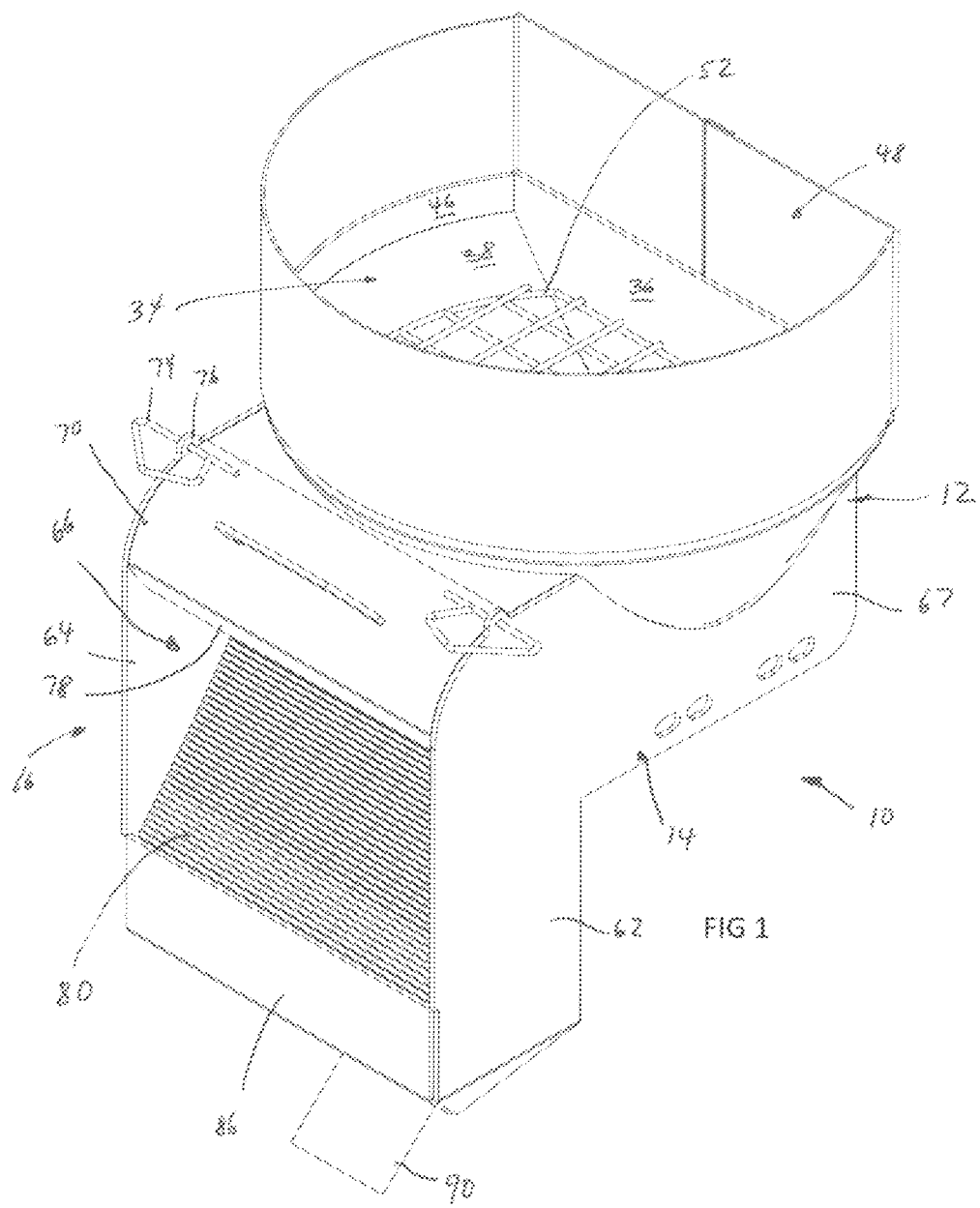
FIGS. 1 and 2 are perspective views of an apparatus according to an embodiment of the invention, as seen from offset angles from the front and rear of the apparatus.
Figure 2:
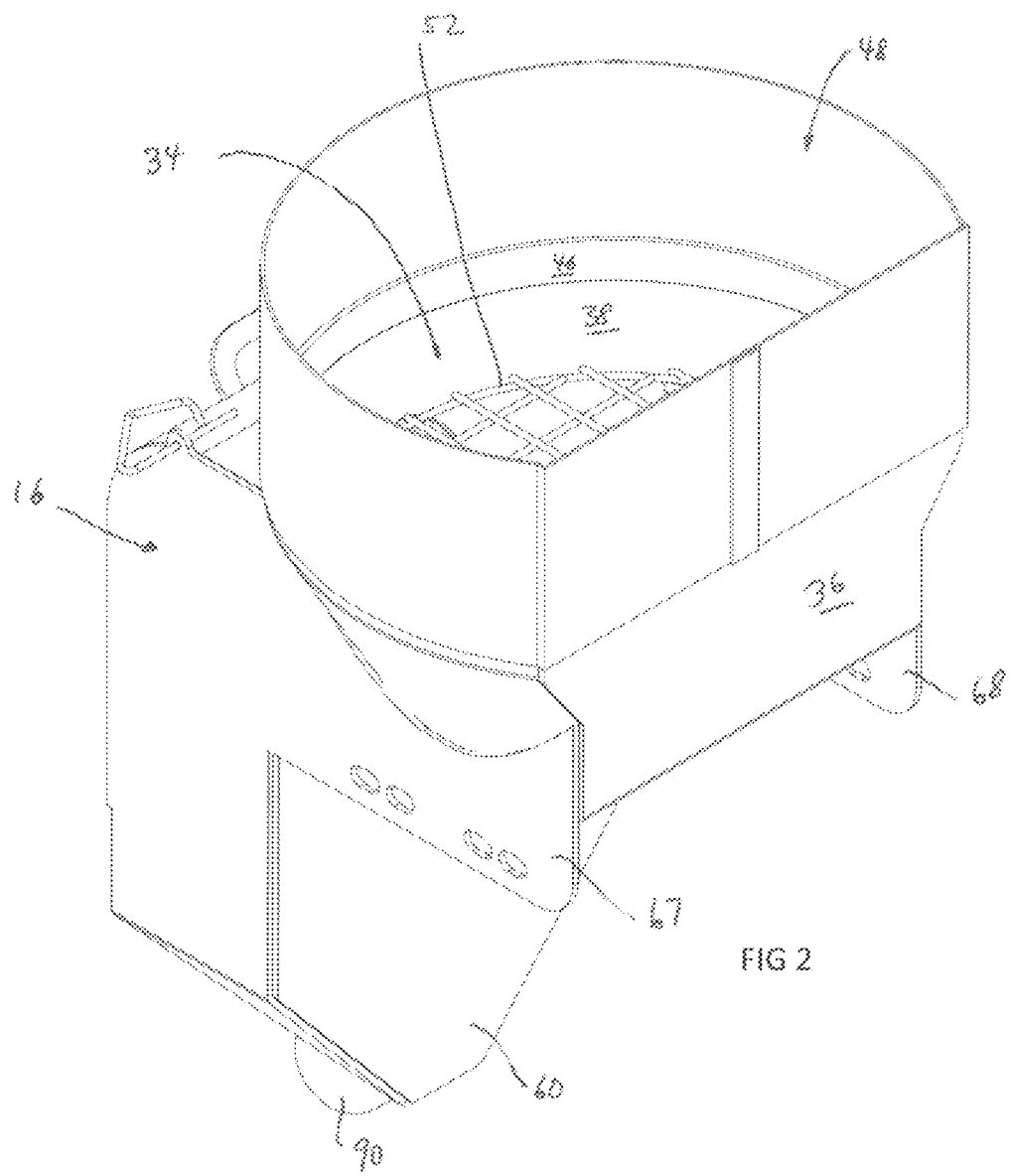
Figure 3:
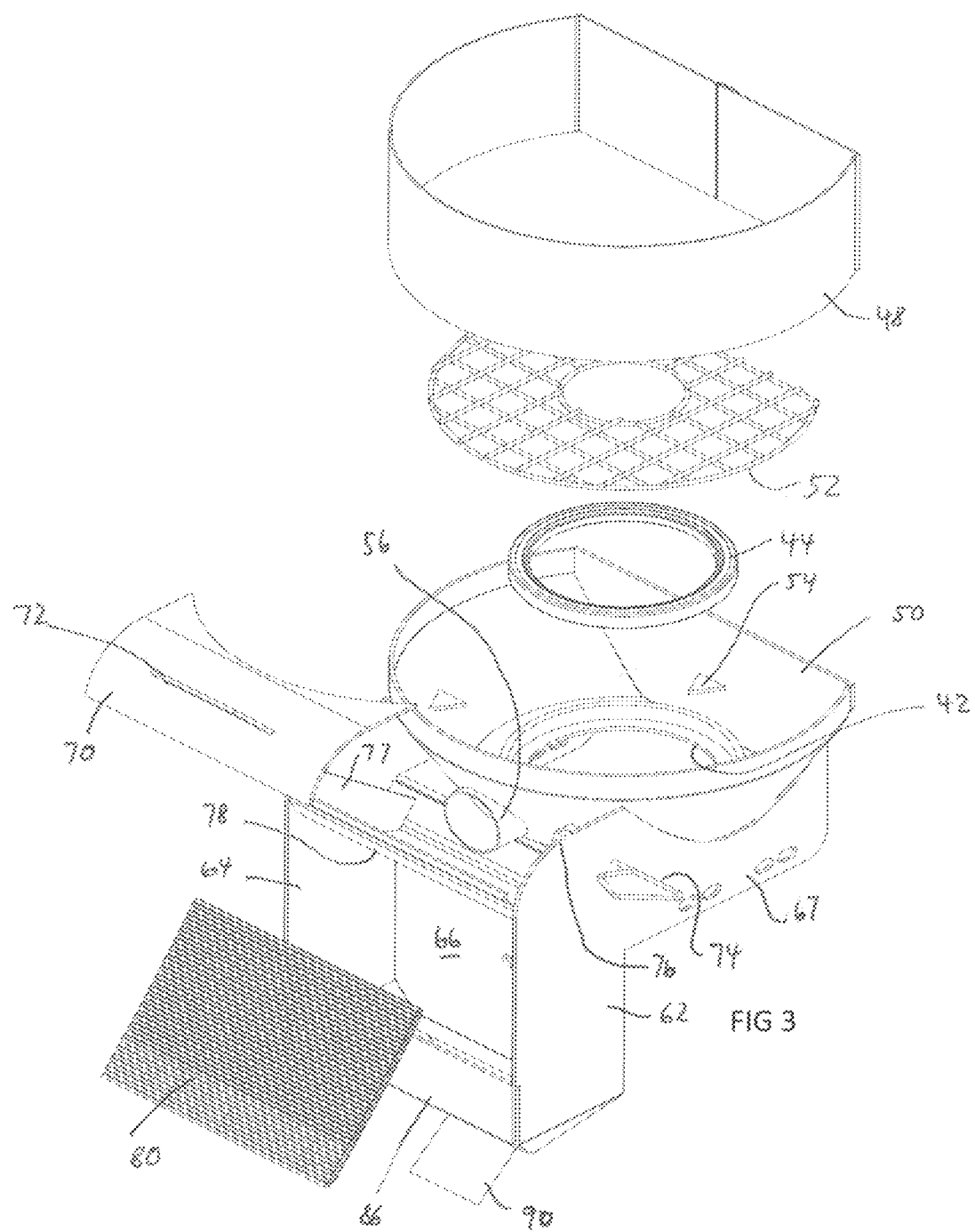
FIG. 3 is an exploded view depicting components of the apparatus of FIGS. 1 and 2, as viewed from the front perspective view of FIG. 1.
Figure 4:
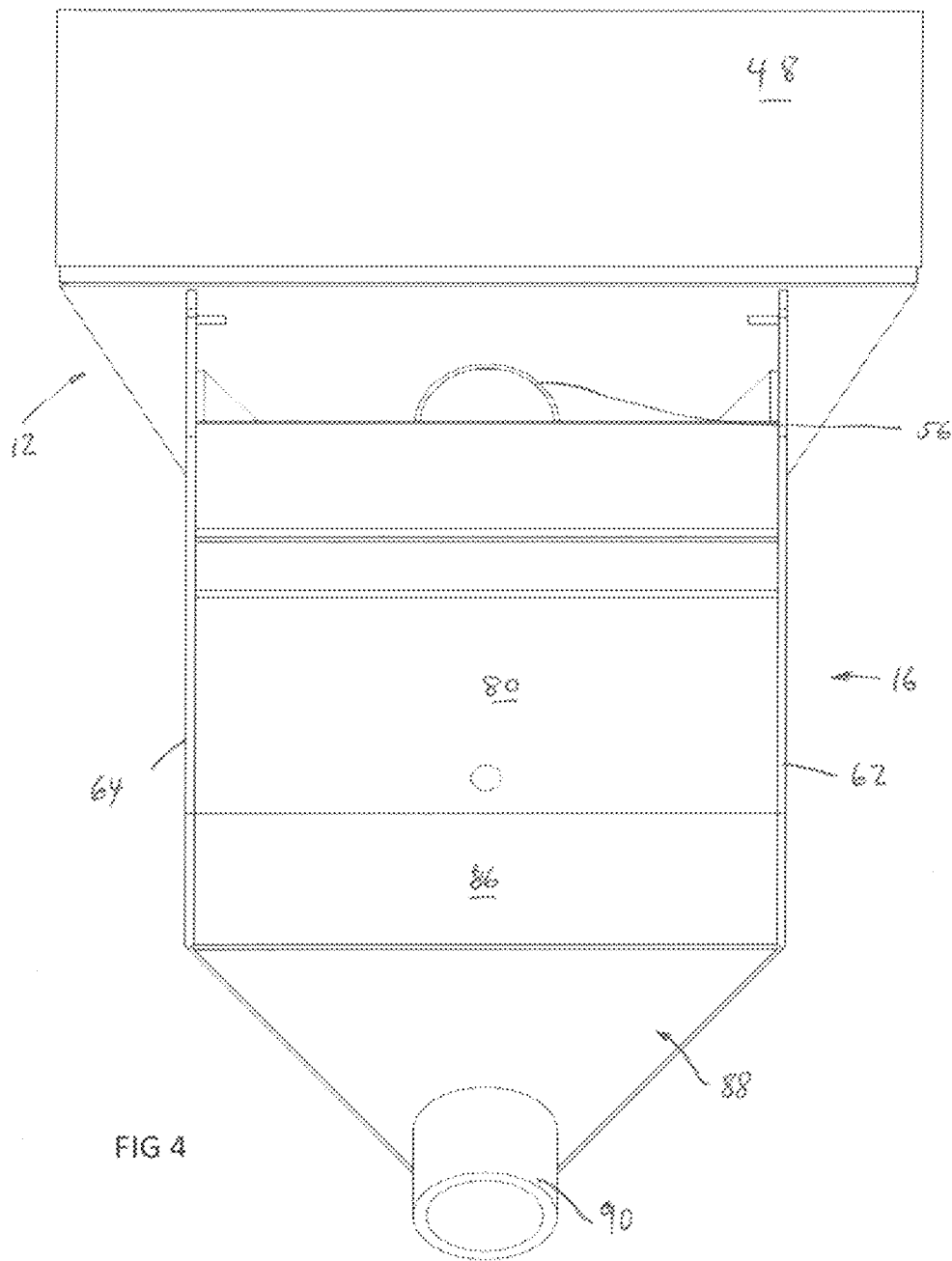
FIG. 4 is a front elevation of the apparatus of FIGS. 1 and 2, with an access door and filtering screen of the apparatus removed.
Figure 5:
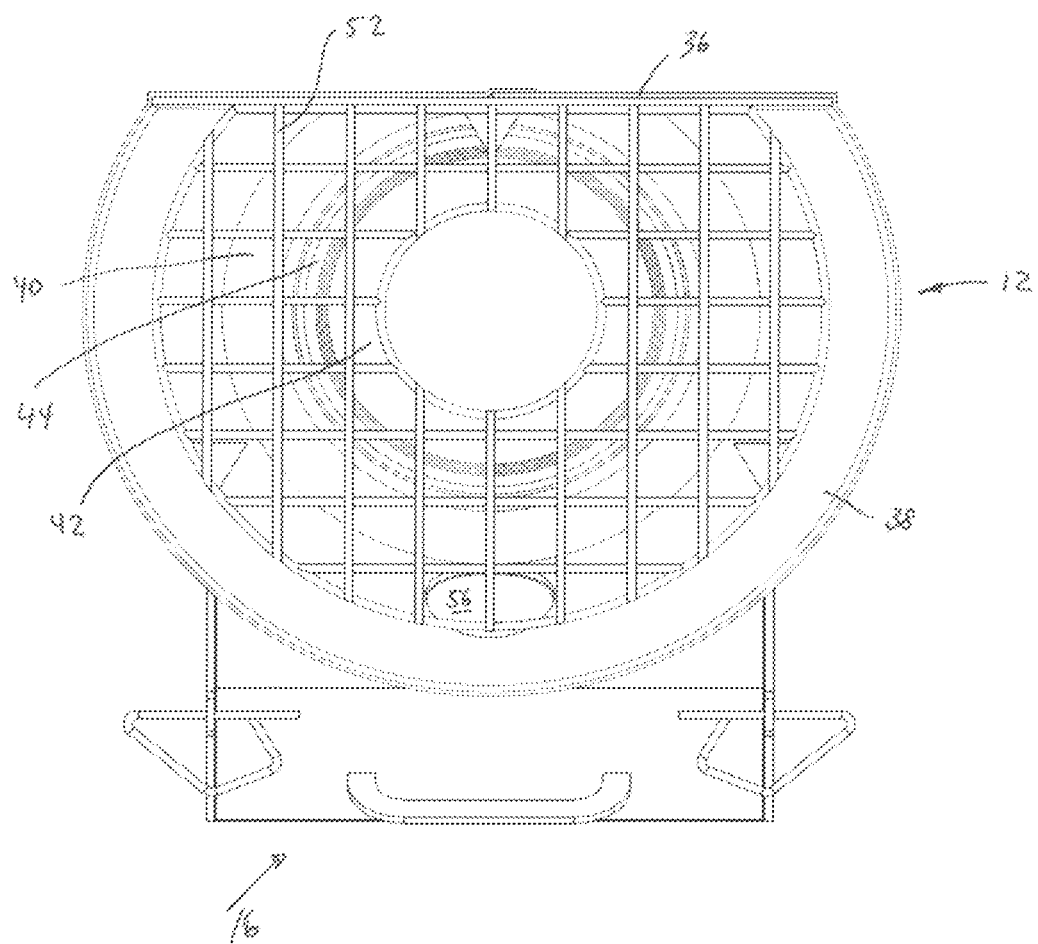
FIG. 5 is a top plan of the apparatus of FIGS. 1 and 2.

Referring first to FIGS. 1, 2 and 3, reference number 10 identifies an apparatus for recovery of liquid (hereinafter simply referred to as water) employed during an overhead drilling operation into strata (eg a rock face) for flushing out drill cuttings (fines, rock pieces, dust etc) as drilling is performed with a rock drilling rig, and cooling the drill tool head (drill bit or steel) according to one particular preferred embodiment of the present invention.

The apparatus 10 comprises principally a funnel structure 12, a mounting structure 14 and a spillway structure 16, integral with one another. For ease of reference, relative terms such as front, rear, side, upper, lower, etc, will be used also to facilitate understanding. It will thus be noted that funnel structure 12 is located at the top above the mounting structure 14 and the spillway structure 16 is located directly adjacent on the front but offset and below the funnel structure 12.

Figure 7A:
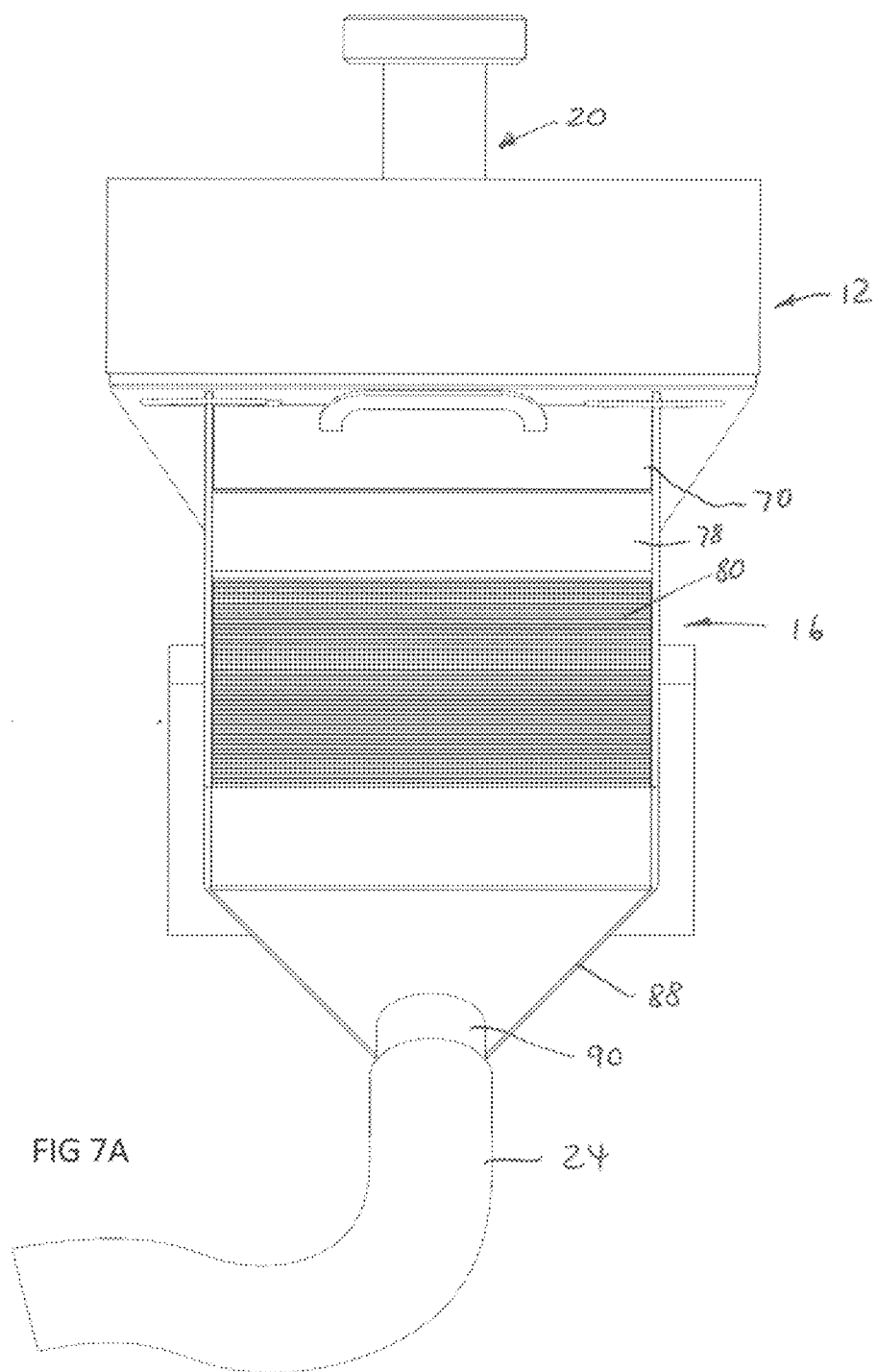
FIGS. 7A and 7B are a front elevation and associated cross-sectional view through a centre line of the apparatus installed in situ atop a housing for a drill motor, around a drill chuck extending from the drill motor housing, and with a drainage hose leading away from the apparatus.
Figure 7B:
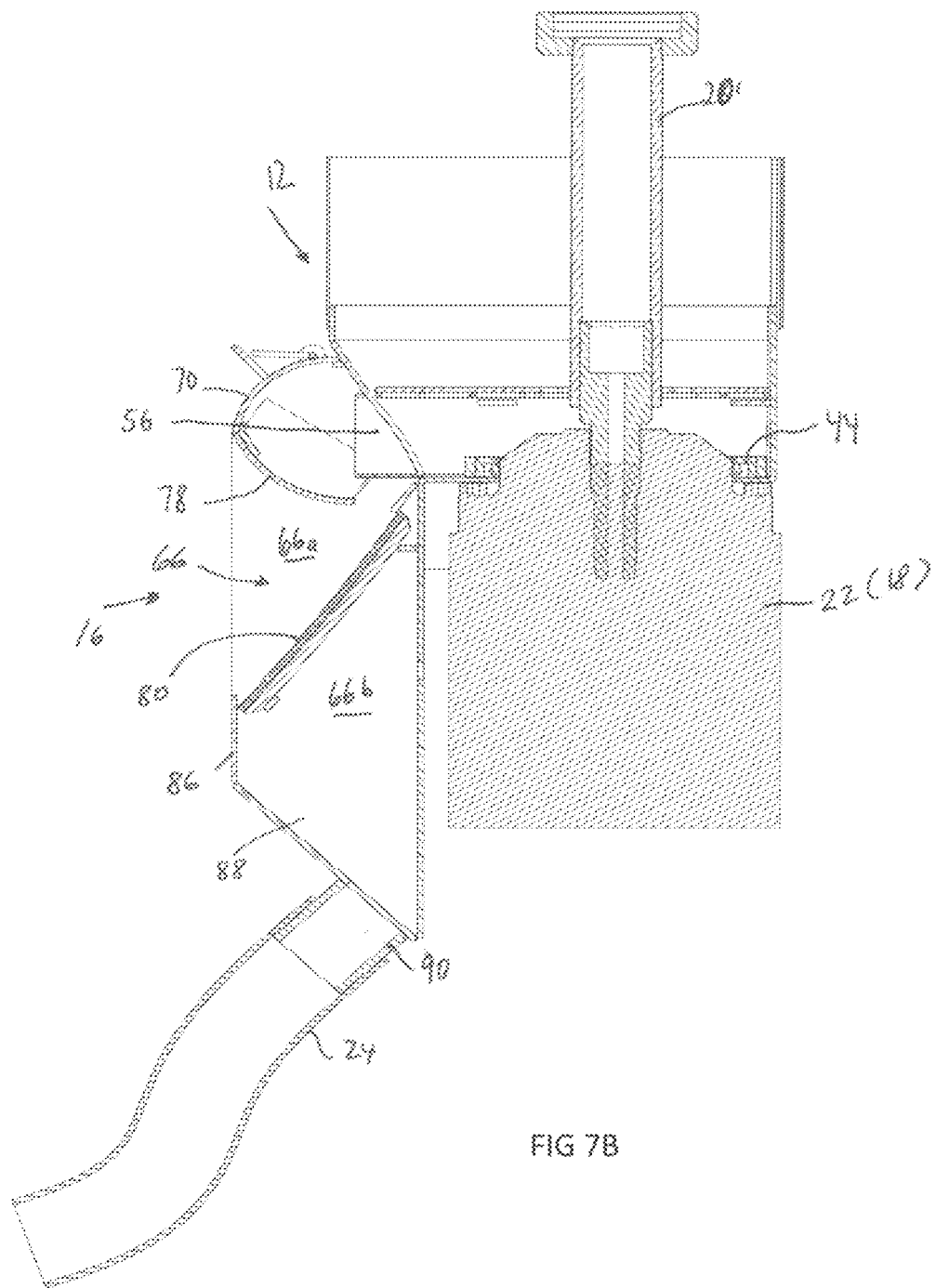
Figure 9:
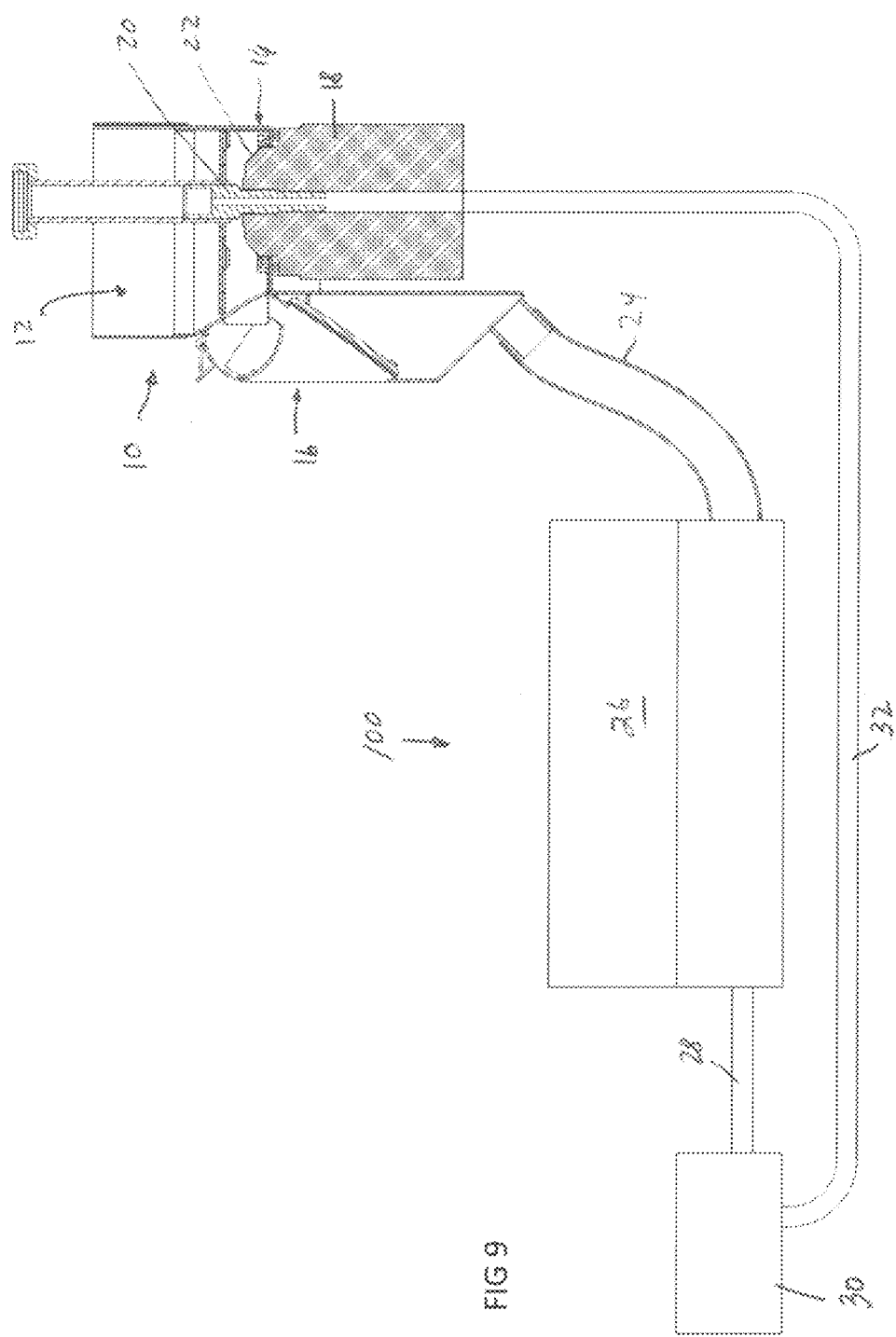
FIG. 9 depicts a system for reticulating drill water embodying the apparatus of FIGS. 1 and 2, shown in a cross-sectional view corresponding to that of FIG. 7B, which depicts a detail of FIG. 9.

Before describing the apparatus 10 in further detail, it is instructive to briefly review its application in context, as depicted in FIGS. 7A and 7B, and 9. The apparatus 10 is, as depicted, mounted at the housing 22 on top of a drill motor 18, which has a drill chuck 20 projecting upwardly, of an overhead drilling rig (not shown). The apparatus 10 is devised to capture the slurry mixture of drill cuttings and spent bore hole flushing (or rinse) water that falls during an overhead drilling operation and which otherwise would impact on and run down the side of the drill rig 22. A drainage hose 24 connected to apparatus 10 removes spent rinse water drained from the slurry mixture collected by apparatus 10.

Overhead drilling rigs will not be described herein any further, and reference should be made to appropriate literature. The broad principle of operation of apparatus 10 is to collect the slurry mixture of spent rinse water and drill cuttings as this heterogeneous mass falls—and remove a substantial part of the spent rinse water from the drill cuttings, which are discarded, while the recovered spent rinse water is drained away for collection in a sedimentation or storage tank 26 from where it can be extracted through pipe 28 by a normal water suction pump 30 (as compared to specialist slurry pumps used in mining) for recirculation via suitable pipe work (plumbing) 32 for re-use as flushing water for a drill string and bit. The collected spent rinse water can be stored and continuously reticulated, as depicted, or drained—or pumped away as waste as requirements dictate. Apparatus 10 is devised to drain water with some fines in it, ie not to entirely filter the spent rinse water at the apparatus of all particulate matter above a certain particle size. Discarding the drill cuttings from the slurry to a relatively fine level at the apparatus is sufficient to allow reliable pumping using general-purpose pumping equipment, avoiding pump failure which can otherwise occur if particulate matter such as drill cuttings is attempted to be pumped using conventional water pumps.

Returning to FIGS. 1 to 3, funnel structure 12 comprises a lower funnel pan 34 having an upright back wall 36, an inclined, partially frustoconical wall 38 and an annular base part 40 with a circular central aperture 42 for accommodating and allowing passage from below the base of drill chuck 20 (as depicted in FIGS. 7A and 7B). It will be noted that the funnel structure 12 overall is not strictly speaking frustoconical in mathematical or geometrical sense, and does not imply that the funnel is exactly or even approximately circular in shape, but only that it defines an receptacle zone with a substantial part of the inward facing surface inclined to direct material towards the base part 40. The top edge of lower funnel pan 34 is in fact not circular but is clipped at its rear. This is not of any especial significance, beyond the fact that this particular configuration is adopted so that the funnel section 12, in plan view, not exceed the footprint of the drill motor housing 22 to which the apparatus 10 is fitted (as best seen in FIG. 7B).

The funnel pan 34 provides a lowest drainage point for slurry mixture falling into and collected by the funnel structure 12, as is noted below.

Within the aperture 42 of annular base part 40 there is located and seated a circular gasket 44, which serves to seal the funnel pan's bottom against the head part of the drill housing 22 from leaking slurry mixture onto the drill motor 18 located beneath the apparatus 10.

As noted, whilst the mayor part 38 of the side wall of funnel pan 34 is generally angled upwardly and outwardly from the flat annular base part 40, a minor portion of the funnel sidewall 36 is angled vertically at the rear. It will be furthermore noted that the uppermost terminal rim portion 46 of the inclined wall 38 also extends vertically. This portion 46 serves to help collect slurry mixture, and permits convenient and secure fitting of an optional, removable collar 48, which has a footprint of similar contour as the open top of funnel pan 34 and by way of which the volume of funnel section 12 can be increased by vertically extending the peripheral walls 36, 38 upwards.

The collar 48 is secured by a suitable clamp or tie, and is preferably made of a hard-wearing, transparent (or translucent) and resilient rubber-like material, such as a silicone or urethane based material. This permits ready visual inspection into the funnel 12, and can be replaced as required if damaged or worn. In contrast, the remainder of funnel section 12 is made from suitably gauged steel sheet material.

The open mouth (top) 50 of lower funnel pan 34 is preferably covered by a wide gauge grate 52 that is supported at discrete horizontally extending lugs 54 welded onto inclined and upright side walls 38, 36 of pan 34. The gauge of grate 52 is selected to catch rocks that may be fall with drill cuttings into the funnel section 12. The contour of grate 52 is best seen in FIG. 3, and is shaped to fit inside the funnel section 12, and match the central aperture 42 in the annular base part 40 of funnel pan 34 and the profile of the funnel sidewalls. The gauge of the grate 52 is selected to pass all but the largest drill cuttings—and in the preferred embodiment is formed as grid spaced at approximately 25 mm by 25 mm. Such larger pieces of material may cause blockages during operation, and accordingly are best caught before attempting to pass through the funnel section 12. Periodically clearing the grate 52 by hand removes further impediment from outsized pieces trapped by the mesh 210.

Slurry mixture falling to and captured by funnel section 12 is passed to the adjacent spillway section 16 via cylindrical pipe stump 56, which is welded to the outside of inclined wall 38 about or within a corresponding circular port (or through hole) provided in the inclined funnel sidewall 38 at the front and centre of the apparatus. The lowest extent of cylindrical pipe stump 56 is flush with the funnel pan 34, ie the annular base wall 34, to avoid collecting excess slurry mixture within the funnel pan 34. The diameter of the conduit (pipe stump) 56 is approximately 40 mm, though a variety of other configurations and dimensions may be used. The conduit 56 terminates within the spillway section 16, where slurry mixture from the funnel section 12 is discharged.

The spillway section 16 comprises a duct-like vertical structure 58 with three closed wall components, a rear wall 60 and two side walls 62, 64 which define an essentially bracket or angular u-shaped vertical channel or through 66 open to the front side of apparatus 10. Duct-like vertical structure 58 in the preferred embodiment extends vertically, and in use is positioned against a vertical side of the housing 22 of the drill motor 18. This ensures that the apparatus 10 has a compact footprint.

The spillway sidewalls 62, 64 are flush with and formed integrally with side skirts 67, 68 that extend downwardly from and at the sides of the funnel section 12. The skirts 66, 68 form part of the mounting structure 14 of apparatus 10 in that they serve to locate the apparatus 10 relative to the drill motor housing 22.

At an upper end of spillway section 16, where the spillway sidewalls 62, 64 meet the funnel section 12, there is mounted a 90 degree curved access door 70 positioned to span between the sidewalls 62, 64. The access door 70 has a handle 72, and is conveniently retained in place to close the upper end of spillway channel or through 66 by an interference fit, and also with assistance from retaining clips 74 or similar fixtures that are fitted in association with co-operating lugs 76 extending from the sidewalls 62, 64.

The access door 70 (as best seen in FIG. 3) is shaped to fit flush with the edges of the side walls 62, 64 of spillway section 16 and has a rearwards located arcuate edge so that it can fit flush against an outer surface of the partially frustoconical inclined sidewall 38 of lower funnel pan 34. The access door 70 curves down from its horizontal rear portion to its vertical front portion such as to be located horizontally displaced from the terminal end of slurry discharge pipe stump 56. Thus, access door 70 serves the double purpose of providing a splatter surface for slurry discharged from pipe stump 56 and allow access to it in case of blockage.

Figure 6A:
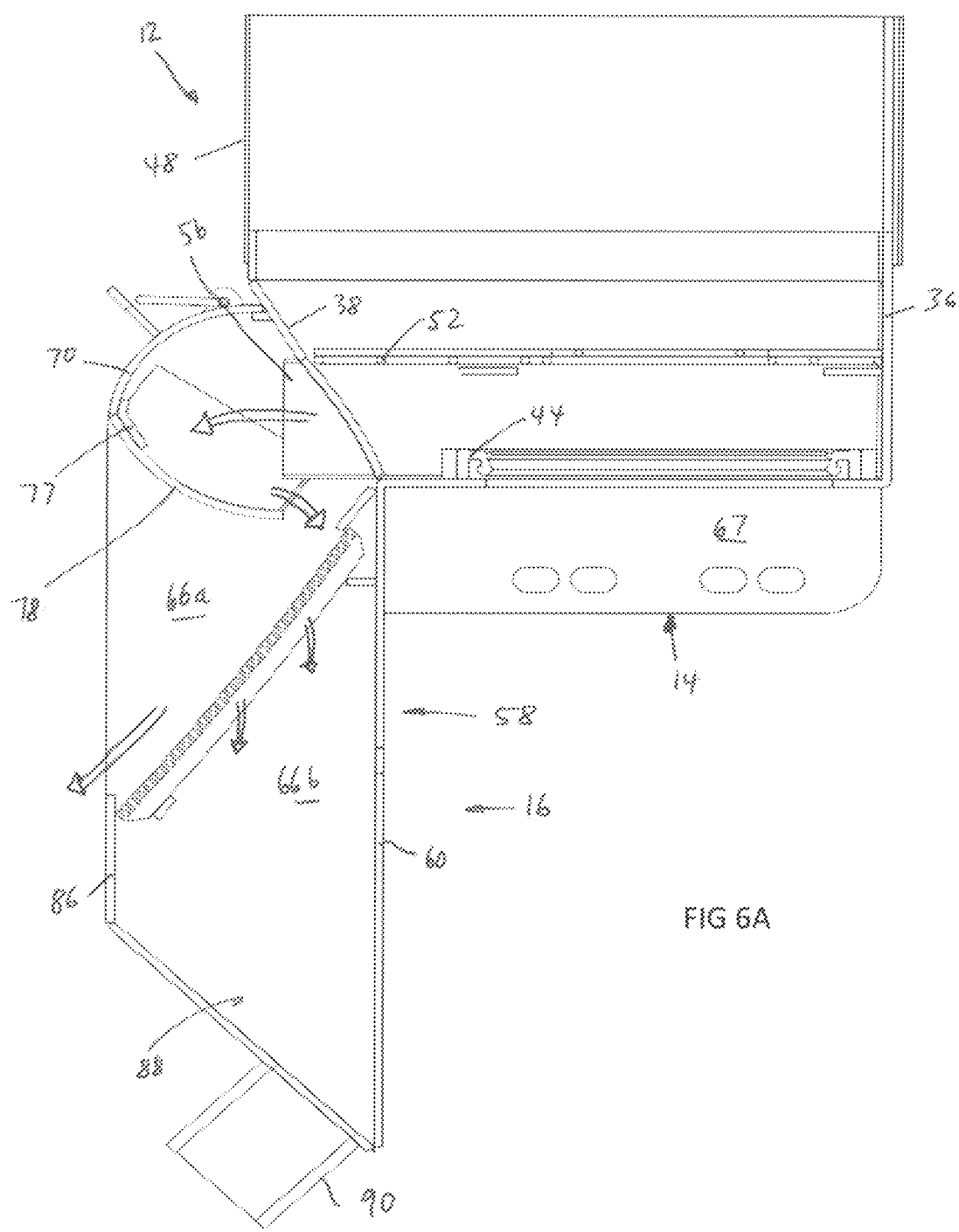
FIGS. 6A and 6B are cross-sectional views of the apparatus of FIGS. 1 and 2, from respective sides of the apparatus.

The access door 70 has attached to its lower terminal front edge via mounting angle 77, a resilient but otherwise formstable baffle 78. As best seen in FIG. 6A, the baffle 78 is provided as a concave strip of material, (or lip) curved slightly upwardly and extending in rearward direction towards the rear wall of spillway section 16 to end about level with the discharge location of pipe stump 56. Baffle 78 thus provides a channel extending width wise between the spillway side walls 62, 64 by way of which the slurry discharged from pipe stump 56 and splattered by the inner, curved face of door 70 is caught and spread along the width of the spillway, and subsequently discharged curtain-like into the vertical channel/through 66 of the duct-like structure 58. The baffle 78 moderates and to a practical extent controls flow of incoming slurry mixture, so that the incoming slurry mixture is collected by the baffle 78, and then with the continual arrival of slurry mixture spills over the free rim of baffle 78 into spillway duct 66.

Figure 6B:
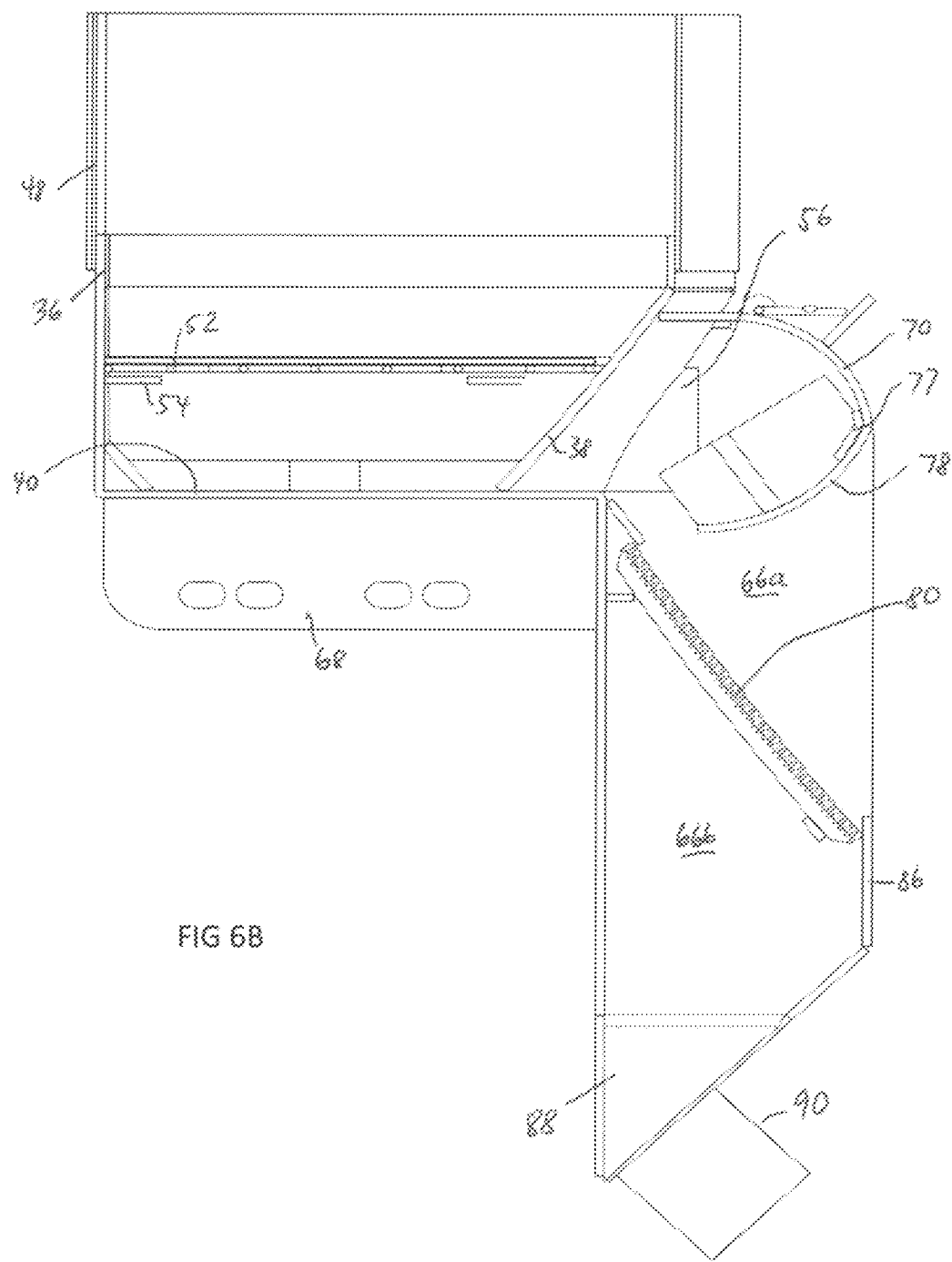

It will be noted from FIGS. 3 and 6a-6b in particular, that an inclined filtering (in the sense of de-watering) grate (or screen) 80 is mounted within through 66 between the side walls 62, 64 such as to subdivide the channel 66 into a portion 66a that is open towards the front of apparatus 10 and a rear portion 66b, serving as a liquid catchment zone for water separated at the grate 80 from the mixed slurry that is discharged onto it by baffle 78. The upper edge of grate 80 is supported at suitably shaped locating bars, schematically illustrated at 82, 83, positioned horizontally spanning the spillway sidewalls 62, 64, whereas the lower end is equally supported at locating bar 84 such that grate 80 can be inserted and removed from channel 66 as and when required. The planar dimensions of grate 80 are chosen such that it can fit snuggly between the spillway side walls 62, 64 and extend from near spillway rear wall 60 just below the terminal edge of baffle 80 at an angle towards a vertically extending front wall 86 at the lower end of the duct-like vertical structure 58. Thus, slurry mixture discharged onto the de-watering grate is cascaded along the grate 80 for discharge at its lower end and along vertical front wall 86.

The filtering screen (dewatering grate) 80 is preferably simple and robust in construction, and in the preferred embodiment consists of a series of spaced apart rails connected by a series of underlying spaced apart studs. The pitch of the rails is relatively tight, and each rail is approximately 1.5 mm in width, with adjacent edges spaced apart by a comparable amount. The rails have a depth of approximately 2 mm, and with sufficiently heavy studs the screen 80 is suitably robust. The grate 80 in basic configuration is evocative of window louvres, or a cattle grid in miniature. A variety of different configurations may be used to achieve a desired rate and amount of dewatering of the mixed slurry, as a matter of trial and experimentation.

As noted, in operation of apparatus 10, the slurry mixture spills from the baffle 78 onto an upper region of the dewatering grate 80, into zone 66a of the trough, and progressively runs down the screen towards its lower region. As it progresses, spent rinse water in the slurry mixture drains away through the rails of the grate 80, and into the rearward liquid catchment zone 66b of channel/through 66 of spillway 16. Fine particles in the slurry mixture will also pass through the screen 80, though larger particles will run down the screen 80, and be discharged at the bottom of the screen 80, at which point the slurry mixture is largely drained of spent rinse water.

With extended use of the apparatus 10, the dewatering grate (screen) 80 wears as a consequence of the abrasive effect of slurry mixture and specifically the suspended drill cuttings rubbing against the screen. The leading edges of the rails become rounded slightly with use, which marginally reduces the efficiency of the grate 80. The grate 80 is less able to effectively 'cut' into the slurry mixture as a consequence. A perceptible slowing of the drainage rate drainage can be noticed with careful observation. The grate 80 can be removed and replaced 'upside down' to expose the opposite (unworn) corners of the rails of the screen 80. Should the screen 80 become worn in both orientations, the screen 80 can be substituted with a replacement if necessary. Specially engineered screens having greater complexity may be contemplated, but are not necessary for effective operation of the apparatus 10.

The 'water screening' grate 80 is angled relatively steeply, and in the preferred embodiment approximately 55° from a horizontal plane. This angle permits a relatively compact footprint for the apparatus 10 whilst also effectively draining the slurry mixture. A broader range of angles is of course possible, with angles between 30° and 80° to a horizontal plane being feasible, and angles between 45° and 65° being favoured for reasons already mentioned. Should the angle be too steep there will be insufficient drainage, and too shallow an angle will tend to clog the screen 80, and also extend the footprint of the apparatus 10.

The grate 80 may appear to be particularly steep, but is found to be remarkably effective in efficiently draining slurry mixture in operation, with a high recovery rate of spent rinse water.

The apparatus 10 as a whole is advantageously fabricated from laser cut stainless steel, welded together. Use of a suitable gauge stainless steel plate results in a robust unit which is well able to resist corrosion and is unlikely to require in field repair, and which weighs of the order of 10 kg. Certain components as mentioned are desirably provided in a suitable rubber-like material, such as collar 48, gasket 44, and baffle 70. Certain parts may require periodic replacement, such as the flexible components noted, as well as screen 80, mesh 52, and retaining clips 74.

The spillway section 16 incorporates at its lower end a rain water head structure 88 similar to those found in many downpipes of roof gutter structures of houses. The discharge duct 90 from rain water head structure 88 extends outwardly and downwardly to connect to drainage hose 22 as shown in FIG. 9. The rain head 88 is angled inwardly to collect the spent rinse water delivered from the spillway 16, which is then delivered out the hose 22.

FIGS. 7A and 7B depict use of the apparatus 10 in conjunction with a drill motor 18. The tip of the drill steel typically terminates in a drill bit or other rock-working tool adapted for working the drilling surface.

The apparatus 10 in use is centred around the drill chuck 20 and resting atop the drill motor 18. The drill motor 18 as depicted has a generally rectangular housing, with a flat top surface, and vertical sides.

The apparatus 10 is generally shaped to fit around the top surface of the housing of the drill motor 22, and against a vertical side of the housing. The drill chuck 20 fits into the drill motor 18 for receiving torque from the motor and transferring to the drill steel. The drill chuck 20 can freely rotate within the apparatus 10 owing to the central aperture 42 of the lower funnel base 34.

During operation, pressurised rinse water is fed through the housing of the drill motor 18, through the drill chuck 22, and into the hollow interior of the drill steel. When working a rock face of the like, the rinse water is forced through the end of a dill bit attached to the drill steel, and rinses away drill cuttings and fines, and any other dirt, debris or vegetative material that is scored by drilling. The spend rinse water, mixed with the drill cuttings and the like, forming a slurry mixture as described, falls from the working surface downwards adjacent the drill steel.

A typical site uses a hydraulically-driven mast which tracks adjacent the drill steel. At the drilling site working surface, a timber jack and attached plate is pressed and holds firm up against the surface surrounding the drilling site to be drilled by the drill bit. A jawed clamp attached to the mast is used to hold the drill steel when required—such as when a further drill steel is to be added or swapped or removed. The drill steel is driven by the chuck 20 by means of a square brace arrangement which allow for torque transfer from the motor via the chuck 20.

A rubber shroud (not shown) may optionally be provided and attached to the accompanying mast, and disposed around the drill bit or drill steel at or near the working surface as drilling takes place. This can assist in collimating the mixture as it falls. Moreover, one can minimise the spent rinse water and drill cuttings from flying too far afield, and containing most of the mixture to a relatively confined perimeter within a contained radius from the drill steel.

While the drill steel is implied as operating in a dead vertical orientation, it can in fact operate at an angle. The apparatus 10 can accommodate such angles, though the use of the collar 48 as described may need to modified or removed to assist in collecting as much spent rinse water as practicable.

FIGS. 8A and 8B are provided for completeness, and provide views of an exemplary drill chuck 800 used in proximity to the apparatus 10. The drill chuck 800 comprises a chuck head 810, and extending along a longitudinal axis of the chuck head 810 a shank 820 which is circular in cross-sectional profile. Disposed along the shank 820 is a brace 830, which as depicted is of square-profile, and is adapted to fit in a matching recess in a drive piece of the drill motor. The shank 820 and brace 830 are conventional in construction, and used to transfer torque from the drill motor to the chuck 800 and thence to a drill steel, associated rock working tool, and ultimately the working face of the rock.

FIG. 9 depicts an integrated system 100 which relies upon the apparatus 10 to collect spent rinse water. The drainage hose 24 is connected at one end to the downpipe attached to the rainhead 88 of the apparatus 10. At its other end the drainage hose 24 discharges spent rinse water to a (schematically depicted) holding tank 26. A pump 30 (also schematically depicted) and associated feed hose 28 removes spent rinse water from the holding tank, and pumps to back via return line 32 to the drill motor 18 to reuse. Any suitable general-purpose pump may be used, whilst the spent rinse water circling through the system 100 will not be clear, filtering by the apparatus 10 ensures that drill cuttings of sufficient size to inhibit reliable operation is largely removed. The pump 30 should be suitably rated, and adequate to sustain the desired flow rate—an indicative exemplary flow rate 1500 L/hour is mentioned above.

As a proportion of the rinse water is inevitably lost during operation, provision for injecting supplementary water (for example, into the holding tank 26) is advantageously provided—such as via a pressurised inlet and control float, for example, or any other suitable means.

A reticulation circuit is thus formed and requires the circulation of far less water than if spent rinse water is simply left to soak into or collect around adjacent ground.

While the apparatus 10 and system 100 described and depicted herein is presented according to one particular preferred embodiment, there are in fact many varied alternative forms the present invention can be embodied. Various additions, modifications and substitutions regarding design and construction can be made without departing from the spirit and scope of the invention.

The claims defining the invention are as follows:
1. A drilling liquid collecting apparatus, comprising:
   a mounting structure shaped to allow removable mounting of the apparatus to a housing part of an overhead drilling apparatus;
   a funnel operatively fitted around a drill steel or drill chuck for receiving a slurry mixture of drill cuttings and spent borehole rinse liquid and/or cutting tool cooling liquid produced during a drilling operation, the funnel having a base with an aperture for passage of the drill steel or the drill chuck and having a slurry discharge port proximate the base;
   a spillway having a filtering screen operatively fitted thereto, the spillway in communication with the funnel for receiving the slurry mixture from the funnel, the filtering screen arranged for draining a substantial portion of the liquid from the slurry mixture cascading along said filtering screen and discharging the drill cuttings away from the filtering screen, the spillway having at a lower end thereof a liquid catchment zone with a liquid discharge port and at an upper end thereof a liquid draining zone with the filtering screen operatively fitted thereto at an inclined angle versus a vertical direction, the spillway arranged such that slurry mixture exiting the slurry discharge port from the funnel gravity feeds onto an upper end and upper side of the filtering screen to cascade or move along the filtering screen towards a lower end for discharging from the spillway while the liquid is drained from the slurry mixture towards the liquid catchment zone located underneath the filtering screen;
   wherein the filtering screen of the spillway comprises a plurality of rods arranged in a grid with predetermined spacing between lengthwise and width-wise running rods;
   wherein the filtering screen is a planar grate structure comprising of traversing and superimposed intersecting square cross-section rods; and
   wherein the filtering screen is received between opposite vertical side walls of the spillway and angled in the spillway structure at between 45° and 65° to a horizontal plane.

2. A drilling fluid collecting apparatus, comprising:
a mounting structure shaped to allow removable mounting of the apparatus to a housing part of an overhead drilling apparatus;
a funnel structure having a base with an aperture for passage of a drill steel or drill chuck of the drilling apparatus and having a slurry discharge port proximate the base, the funnel structure adapted for receiving a slurry mixture of drill cuttings and spent drill liquid produced during a drilling operation;
a spillway structure having at a lower end thereof a liquid catchment zone with a liquid discharge port and at an upper end thereof a liquid draining zone with a filtering grate operatively fitted thereto at an inclined angle versus a vertical direction, the spillway structure arranged such that slurry mixture exiting the slurry discharge port from the funnel structure gravity feeds onto an upper end and upper side of the filtering grate to cascade or move along the filtering grate towards a lower end for discharging from the spillway structure while the liquid is drained from the slurry mixture towards the liquid catchment zone located underneath the filtering grate;
wherein the filtering grate of the spillway structure comprises a plurality of rods arranged in a grid with predetermined spacing between lengthwise and widthwise running rods;
wherein the filtering grate is a planar grate structure comprising of traversing and superimposed intersecting square cross-section rods; and
wherein the filtering grate is received between opposite vertical side walls of the spillway structure and angled in the spillway structure at between 45° and 65° to a horizontal plane.

3. The apparatus of claim 2, wherein the spacing between the width-wise extending rods is varied along an extension of the grate from an upper, mixed slurry receiving zone towards a lower, de-watered slurry discharge zone.

4. The apparatus of claim 2, wherein the funnel structure has an internal volume sufficient to temporarily receive a predetermined amount of the slurry mixture without overspilling while simultaneously discharging the slurry mixture towards the spillway structure at a controlled flow rate.

5. The apparatus of claim 4, wherein the funnel structure comprises a removable collar extension with a vertical peripheral wall, mountable to an open top end of a lower funnel section having at least in part inclined inner faces terminating at the base of the funnel structure.

6. The apparatus of claim 5, wherein the collar extension is formed of a resilient material which is transparent or translucent to permit ready visual inspection of an inside of the funnel structure.

7. The apparatus of claim 4, wherein the slurry discharge port of the funnel structure communicates with a conduit pipe for draining the slurry mixture received by the funnel structure into the spillway structure in a controlled manner.

8. The apparatus of claim 4, further comprising a grate guard fitted inside or above the open top end of the funnel structure, dimensioned to prevent ingress of rocks of specified size or larger, amongst the drill cuttings, into the funnel structure.

9. The apparatus of claim 2, wherein the spillway structure has at least in part a duct-like u-channel configuration, with opposite vertical side walls and a rear wall spanning the side walls, the filtering grate having a flat, planar configuration and located to extend between the side walls in inclined fashion from near an upper end close to the rear wall towards a lower end distal from the rear wall, a vertical front wall of the spillway structure spanning the side walls adjoining the lower end of the filtering grate.

10. The apparatus of claim 9, wherein the upper end of the spillway structure comprises a removable access door spanning the side walls and fitted opposite a location where the slurry discharge port or a conduit pipe drains into the spillway structure.

11. The apparatus of claim 10, further comprising a baffle positioned in the upper end of the spillway structure opposite an outlet of the slurry discharge port or the conduit pipe to moderate flow of the slurry mixture onto the filtering grate in the spillway structure.

12. The apparatus of claim 11, wherein the baffle is a concave strip running over a width of the spillway structure and spanning the side walls.

13. The apparatus of claim 11, wherein the baffle is mounted in removable manner at the access door.

14. The apparatus of claim 9, wherein the liquid catchment zone of the spillway structure is provided at a lower end thereof with or connected to a rain head structure, with or without an additional filtering screen, which in turn drains to a downpipe for directing the liquid removed from the slurry mixture to further use or discharge.

15. The apparatus according to claim 14, wherein the mounting structure comprises side skirts descending from the funnel structure and arranged for locating the apparatus atop a drill rig.

16. The apparatus according to claim 15, wherein funnel structure is adapted to operatively sit atop a drill motor, and wherein the aperture in the funnel base comprises a sealing ring adapted to receive and seal against a drill motor casing head.

17. A system for recovering bore hole flushing or rinse fluid from drilling slurry mixture comprised of drill cuttings and liquid obtained in a strata drilling operation, comprising: the drilling fluid collecting apparatus according to claim 2 mounted atop an overhead drilling rig, a drainage pipe connected to the apparatus for receiving the liquid drained by the apparatus from the slurry mixture, a holding tank connected to the drainage pipe for temporary storage of the drained liquid, and a pump for pumping the drained liquid from the holding tank via piping to the drilling rig for re-use in bore hole drilling.

18. An overhead drill rig with recycled borehole flushing water delivery arrangement, comprising: a drill motor and drilling tools, a drilling fluid collecting apparatus according to claim 2, a drainage pipe connected to the apparatus for receiving the liquid drained from the slurry mixture via the liquid catchment zone located underneath the filtering grate of the apparatus, a holding tank connected to the drainage pipe, and a water pump for delivering reclaimed liquid stored in the holding tank to the drill motor for re-use during a drilling operation.

* * * * *